United States Patent [19]
Bucher et al.

[11] 3,787,085
[45] Jan. 22, 1974

[54] TRACTOR ROLL-OVER PROTECTIVE FRAME

[75] Inventors: David Hoffer Bucher, Bettendorf; Craig Eugene Christie; Don J. Rasmussen, both of Cedar Falls, all of Iowa

[73] Assignee: Deere & Company, Moline, Ill.

[22] Filed: June 23, 1972

[21] Appl. No.: 265,779

[52] U.S. Cl.................. 296/28 C, 296/35 R, 102
[51] Int. Cl............................................ B62d 27/04
[58] Field of Search................ 296/102, 35 R, 28 C; 280/150 C

[56] References Cited
UNITED STATES PATENTS

| | | | |
|---|---|---|---|
| 3,549,170 | 12/1970 | Shankwitz | 280/150 C |
| 3,632,134 | 1/1972 | Babbit | 280/150 C |
| 3,450,430 | 6/1969 | Wendt | 296/28 C |
| 3,455,598 | 7/1969 | Tweedy | 296/102 |
| 3,704,909 | 12/1972 | May | 296/102 |

*Primary Examiner*—Robert R. Song

[57] ABSTRACT

A tractor roll-over protective frame includes front and rear pairs of upright support members which form the corners of a box-like framework. A canopy is supported at the top of the framework and fenders are integral with the opposite sides of the framework. The framework also supports an operator's seat, at its back side, and supports the floor of the operator's station.

11 Claims, 4 Drawing Figures

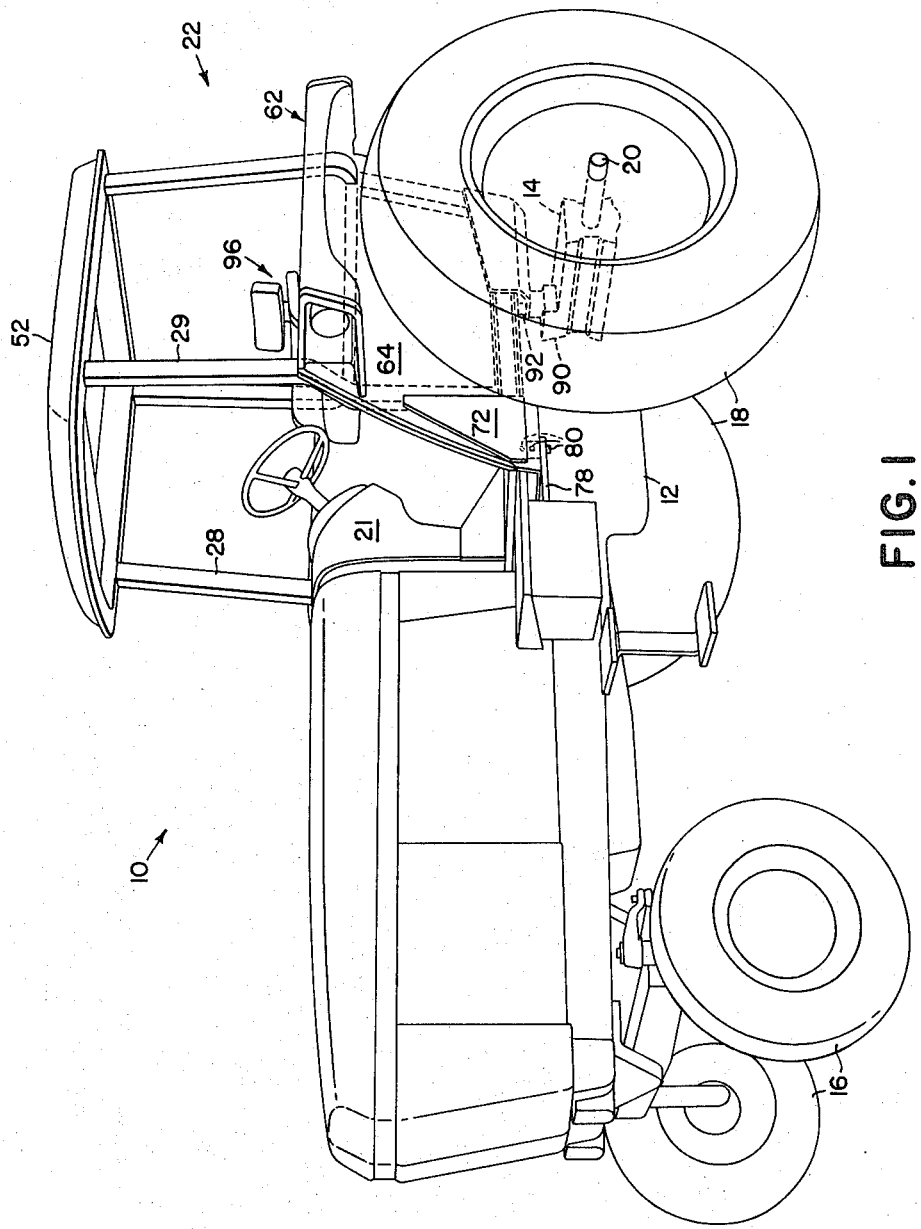

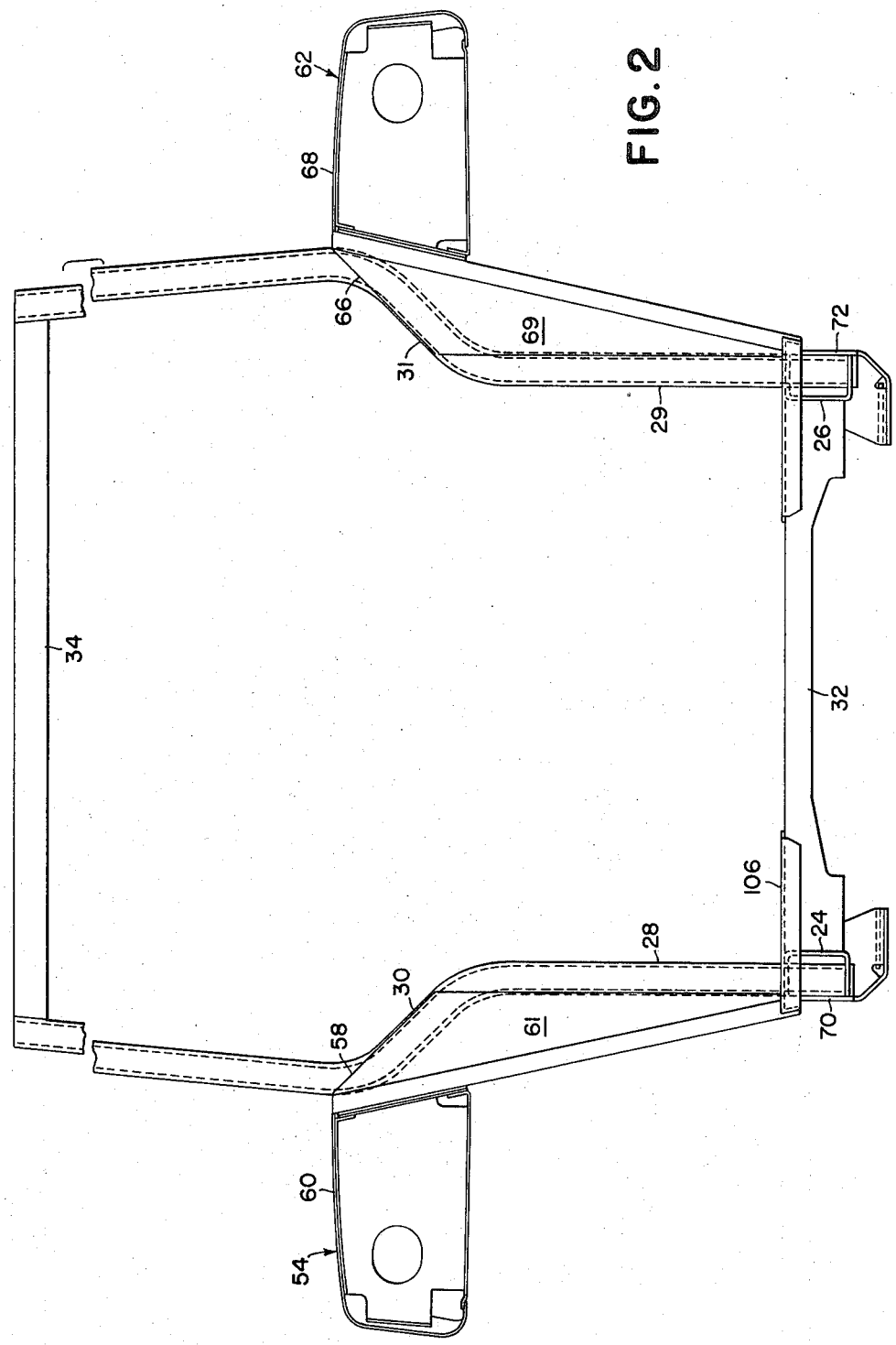

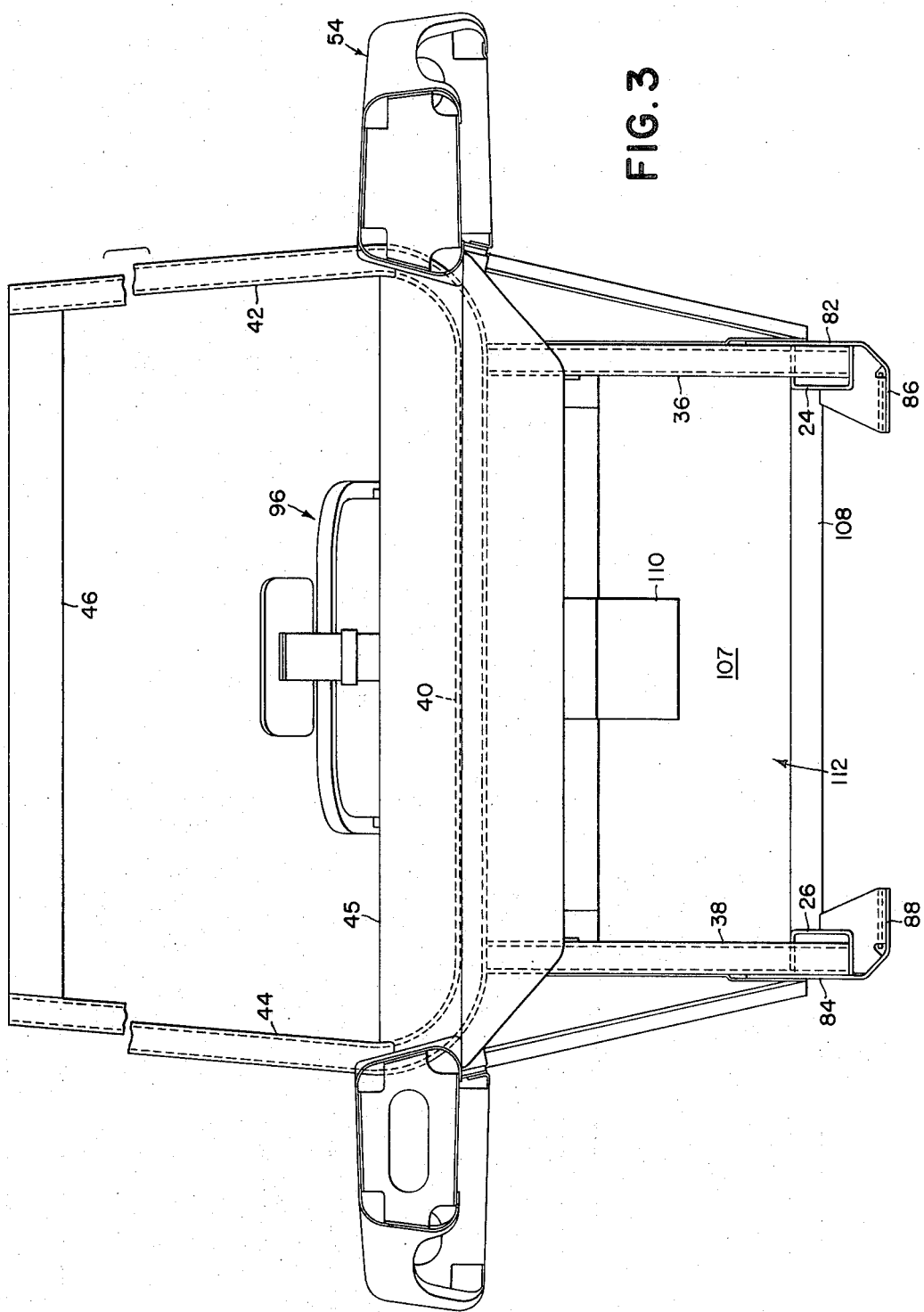

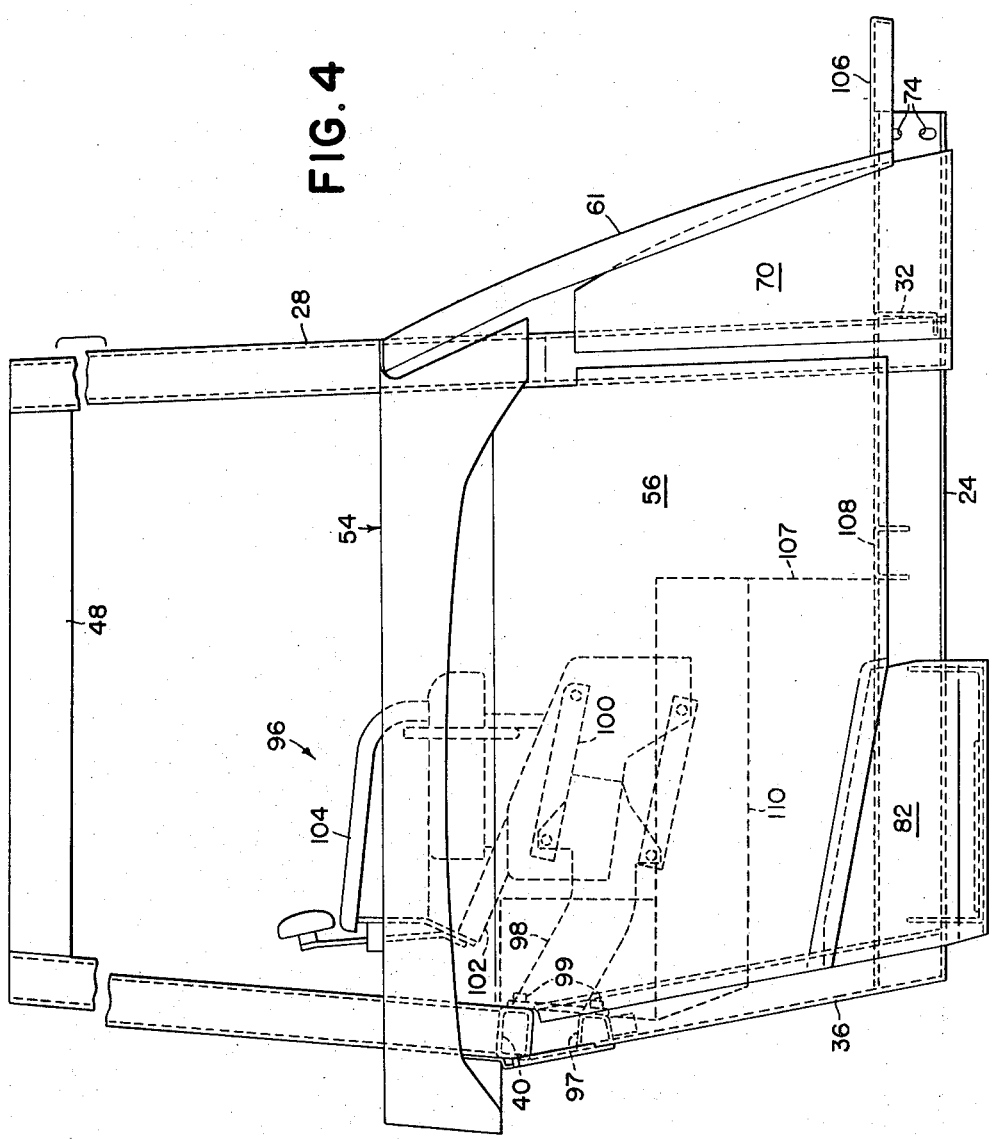

TRACTOR ROLL-OVER PROTECTIVE FRAME

BACKGROUND OF THE INVENTION

The present invention relates to a tractor roll-over protective frame and more particularly relates to a frame having structural members having functions other than just protecting the operator in case of roll over.

Heretofore, it has been the prevalent practice to provide roll-over protective frames as optional equipment to be mounted in protective relationship to the operator's station of a tractor. In other words, certain structure in the vicinity of the operator's station such as the seat, the fenders and the floor of the operator's station are already in their respective mounted positions before the addition of the roll-over protective frame, the latter being mounted on the tractor by passing its members either around or through the existing structure in the vicinity of the operator's station.

Since these optionally mountable roll-over protective frames are not designed integrally with the existing structure at the operator's station, there is the problem of insuring that there is sufficient clearance to prevent scrubbing between the existing structure and the roll-over protective frame structure when the tractor undergoes flections during operation. Furthermore, the space at the operator's station is not used judiciously when the roll-over protective frame is a structure separate and apart from the existing structures at the operator's station.

Another disadvantage of having an optionally usable roll-over protective frame structure is that tractor owners have a tendency not to use roll-over protective structures which, of course, is not desirable from the standpoint of safety.

SUMMARY OF THE INVENTION

Accordingly, it is an object of the present invention to provide a roll-over protective frame structure which overcomes the above-mentioned disadvantages by being designed integrally with certain structure normally found in the vicinity of a tractor operator's station.

More specifically, it is an object of the invention to provide a roll-over protective frame structure including front and rear pairs of upright support structures, a front and rear support structure at one side of the tractor being integral with and braced by one of the tractor fenders and a front and rear support member at the other side of the tractor being integral with and braced by the other tractor fender.

It is a further object to provide a roll-over protective frame structure, as above-mentioned, including a U-shaped member having legs which form the upper portions of the rear pair of upright support structures and having a web which supports an operator's seat.

Still another object is to provide an operator's station floor which is integral with the bottom of the roll-over protective frame structure and to provide a canopy which is integral with the top of the roll-over protective frame structure.

These and other objects will become apparent from the ensuing description and the appended drawings.

BRIEF DESCRIPTION OF THE DRAWINGS

FIG. 1 is a three-quarter perspective view of the left front of a tractor having a roll-over protective frame mounted thereon.

FIG. 2 is a front elevation view of the front pair of upright support structures of the roll-over protective frame and showing the structure interconnecting the bottom thereof, the tops of the upright structures being broken off.

FIG. 3 is a rear elevational view of the rear pair of upright support structures and showing the interconnection between the lower portions thereof, the upper portions of the support structures being broken off.

FIG. 4 is a right side elevational view of the roll-over protective frame structure with the top portion of the structure being broken away and showing the connection of the seat assembly to the frame structure.

DESCRIPTION OF THE PREFERRED EMBODIMENT

Referring now to FIG. 1, there is shown a tractor designated in its entirety by the reference numeral 10. The tractor 10 includes a fore-and-aft extending main frame including a rear portion in the form of a transmission housing 12, a pair of rear axle housings being integral with the rear portion of the transmission housing and extending transversely oppositely therefrom, only one of the axle housings being shown at 14. The forward end of the main tractor frame is supported on a pair of front wheels 16 while the rear of the main frame is supported on a pair of rear wheels 18 which are mounted on rear axles rotatably received in the rear axle housings 14, only one of the rear axles being shown at 20. An instrument support 21 is mounted on the main frame above the front portion of the transmission housing 12.

Mounted on the tractor 10 is a roll-over protective frame 22. The frame 22 includes right and left fore-and-aft extending transversely spaced bottom members 24 and 26, right and left being determined from a position standing at the rear of the tractor and facing in the direction of its forward travel. The members 24 and 26 cross the rear axle housings 14, their forward ends terminating transversely opposite the instrument support 21. Spaced rearwardly from the forward ends of the members 24 and 26 and respectively having their bottom ends connected thereto are right and left front upright support members 28 and 29. The members 28 and 29 include intermediate portions 30 and 31 which are inclined upwardly and outwardly from the lower portions of the members at a level approximately the same as that of the tops of the wheels 18, the upper portions of the members 28 and 29 thus being offset towards the wheels 18 from their respective bottom portions. Interconnecting the bottom members 24 and 26 at a location between the right and front upright support members 28 and 29 is a bottom cross member 32, the tops of the upright support members 28 and 30 being interconnected by a top cross member 34. Connected to the rear ends of the right and left fore-and-aft extending bottom members 24 and 26 respectively are right and left rear upright posts 36 and 38. The tops of the posts 36 and 38 terminate at a level approximately the same as that of the tops of the rear wheels 18. A U-shaped member extends between and has a web 40 fixed to the tops of the upright posts 36 and 38, the opposite ends of the web being curved upwardly and outwardly towards the wheels 18 and terminating in right and left upwardly extending leg portions 42 and 44, the leg portions respectively forming outwardly offset extensions of the right and left rear upright posts 36 and 38 and combining therewith to form a rear pair of upright support structures. A single transverse gusset member 45 reinforces the connection between the web 40 and the posts 36 and 38 and also reinforces the rounded corners at the ends of the web. Extending between the tops of the legs 42 and 44 and joining the same is a cross member 46. A generally rectangular top frame structure on the roll-over protective frame is completed by right and left fore-and-aft extending top members, only the right member being shown at 48. The member 48 extends between the tops of the right leg 42 of the U-shaped member and the right front upright support member 28 and the left top member extends between the tops of the left leg 44 of the U-shaped member and the left front upright support member 29. Overlying and being connected to the upper framework of the roll-over protective frame is a canopy 52.

Formed integrally with the right side of the roll-over protective frame thus far described is a right fender 54 including a vertical portion 56 forming a side panel extending between and being fixed to the outer surfaces of the lower portion of the right front upright support member 28 and the right rear upright post 36. The upper fore-and-aft edge of the vertical portion 56 blends into an upwardly and outwardly inclined portion 58 which in turn blends into a generally horizontal portion 60 which extends outwardly over the top of the right wheel 18. The inclined portion 58 has approximately the same slope as and is fixed to the inclined portion of the support member 28. The fender 54 includes a forward end portion 61 which is fixed to the forward side of and extends forwardly from the lower and inclined portions of the support member 28. The portion 61 is curved outwardly in general parallelism to the periphery of the upper front portion of the wheel 18. Thus, the right fender serves as a bracing member for the right side of the roll-over protective frame.

A left fender 62 is formed integrally with the left side of the roll-over protective frame in a manner similar to the right fender 54. Specifically, the left fender includes a vertical portion 64 forming a left side panel which extends between and is fixed to the outer sides of the lower portion of the left front upright support member 29 and the left rear upright post 38. The upper fore-and-aft extending edge of the vertical portion 64 blends into an upwardly and outwardly inclined portion 66 which in turn blends into a horizontal portion 68 that overlies the left rear wheel 18. A forward end portion 69 of the fender 62 is fixed to the forward side of the lower and inclined portions of the member 29.

Forming a portion of connecting means for securing the roll-over protective frame to the tractor 10 are right and left front gussets 70 and 72, the right gusset being secured to the fore-and-aft extending member 24 and the upright member 28 and extending across the forward corner formed at the intersection of the members, and the left gusset being secured to the fore-and-aft extending member 26 and the upright member 30 and extending across the forward corner formed at the intersection of the members. The gussets 70 and 72 are also respectively secured to the forward fender portions 61 and 69. The right and left fore-and-aft members have forward portions apertured at 74 (FIG. 4) for receiving fasteners cooperating with brackets secured to opposite sides of the tractor transmission housing 12, only a left front bracket 78 and set of fasteners 80 being shown (FIG. 1). Extending across the forward corner formed at the intersection of the right rear upright post 36 and the fore-and-aft extending member 24 is a right rear gusset 82 and extending across the forward corner formed at the intersection between the left rear upright post 38 and the left fore-and-aft extending bottom member 26 is a left rear gusset 84, the gussets 82 and 84 being secured to the members respectively forming the corners across which they extend. The rear gussets 82 and 84 respectively include horizontal bottom portions 86 and 88 which are secured to and reinforce brackets secured to the members 24 and 26, which brackets overlie rear mounting brackets which are fixed to the rear axle housings 14, only the left rear bracket 90 being shown. Fasteners 92 (only one shown) rigidly secure the rear gussets to the rear brackets. Thus, it can be appreciated that the front and rear gussets serve not only to brace the bottom corners of the roll-over protective frame but also serve to reinforce connecting brackets for securing the roll-over protective frame to the tractor.

The roll-over protective frame also provides means for supporting a seat assembly 96. Specifically, the means for supporting the seat assembly 96 includes a reinforcing member 97 in the form of a channel member which extends between the right and left rear upright post members. The seat assembly 96 includes a supporting bracket 98 which is supported from the web 40 of the U-shaped member and the reinforcing member 97 by centrally located fasteners 99. As can best be seen in FIG. 4, the supporting bracket 98 has a height and suspension control linkage, shown partially at 100, connected thereto, the linkage being of a known type which is described in U.S. Pat. No. 2,936,818 issued to Harrington et al. on May 17 1960. Connected to one end of links forming a parallel linkage of the control linkage 100 is a base member 102 to which a seat 104 is integrally fixed.

Also included in the roll-over protective frame is a floor 106 which overlies and extends between the forward portions of the right and left fore-and-aft extending bottom members 24 and 26, the floor terminating rearwardly in an upright wall 107 which extends upwardly from a cross member 108 which extends between and is integrally connected to the fore-and-aft extending members 24 and 26 at a location intermediate their opposite ends. The upright wall 107 is joined along its upper transverse edge by a seat assembly housing section which surrounds the bottom and sides of the seat assembly 96 and defines a central portion 110 in which the control linkage 100 is received. The opposite sides of the seat assembly housing are secured to the vertical side wall portions 56 and 64 of the fenders while the rear of the housing is secured to the web 40. Thus, it is seen that an unoccupied space 112 (FIGS. 3 and 4) is defined at the underside of the roll-over protective frame in the area below and to the opposite sides of the cavity 110 and behind the upright wall 107. When the roll-over protective frame 22 is in place on the tractor, hitch and hydraulic components (not shown) are located in the space 112.

Thus, it can be appreciated that the roll-over protective frame 22 makes judicious use of the available space at the operator's station by incorporating many of the members normally found at the operator's station in the structure thereof.

We claim:

1. In a tractor having a main frame including a rearward transmission housing, a pair of rear axle housings integral with and extending transversely from opposite sides of the transmission housing and a pair of axles respectively rotatably mounted in said housings and having rear wheels fixed thereto, the improvement comprising: first and second transversely spaced, horizontal bottom frame members extending fore-and-aft alongside the opposite sides of said transmission housing and crossing said axle housings; a first pair of mounting means respectively securing said bottom members to said axle housings and a second pair of mounting means respectively securing said bottom members to said transmission housing; first and second upright rear corner frame structures having portions respectively connected to said first and second bottom members and extending upwardly to approximately the level of the tops of the rear wheels, and having upper portions joined to and offset outwardly from the lower portions; first and second upright front corner frame structures respectively including lower portions, having their lower ends connected to said first and second members, and upper portions offset outwardly from and joined to the lower portions by outwardly and upwardly inclined intermediate portions; frame means joining and fixedly spacing the tops of said front and rear upright corner frame structures; a first fender having a vertical portion forming a side panel extending between and being fixed to lower portions of the first upright front and rear corner frame structures, the side panel having an upper fore-and-aft extending edge blending into an inclined portion having approximately the same slope as and being secured to the intermediate portion of the first front corner frame structure; and a second fender having a vertical portion forming a side panel extending between and being fixed to the lower portions of the second upright front and rear corner frame structures, the side panel having an upper fore-and-aft extending edge blending into an inclined portion having approximately the same slope as and being secured to the intermediate portion of the second front corner frame structure.

2. The tractor defined in claim 1 wherein said lower portions of said first and second upright rear corner frame structures respectively comprise first and second posts; a U-shaped frame member having a web extending between and being secured to the tops of said posts, said web having opposite ends extending laterally beyond the posts and terminating in upwardly extending legs forming said offset upper portions of said rear corner frame structure.

3. The tractor defined in claim 2 and further including a seat assembly, said seat assembly including a seat supporting bracket; means securing said supporting bracket to said web; and an operator's seat being mounted on said supporting bracket.

4. The tractor defined in claim 3 and further including front and rear pairs of gussets respectively disposed in corners formed by the intersection of and being secured to the first and second pairs of front and rear upright corner support frame structures and the first and second bottom frame members; and said first and second pairs of gussets respectively forming a portion of said first and second pairs of mounting means.

5. The tractor defined in claim 4 wherein one of each of the first and second gussets are secured to said first fender while the remaining gussets are secured to said second fender.

6. The tractor defined in claim 1 and further including a floor extending between and being secured to said fore-and-aft extending bottom frame members.

7. The tractor defined in claim 2 and further including a floor extending between and being secured to said fore-and-aft extending bottom frame members; said floor terminating at a wall extending upwardly therefrom at a location forwardly of said seat assembly; and a seat assembly housing being joined to the upper edge of the vertical wall, the vertical side portions of the fenders and the web.

8. In a tractor having a main frame including a transmission housing, a pair of rear axle housings integral with and extending transversely from opposite sides of the transmission housing and a pair of axles respectively rotatably mounted in said housings and having rear wheels fixed thereto, the improvement comprising: a roll-over protective frame including first and second rear upright posts spaced transversely from each other and located adjacent respective ones of said axles; first securing means fixing the bottom ends of said posts to said main frame; a U-shaped frame member having a web extending between and being secured to the tops of said posts; said web having opposite ends terminating in upwardly extending legs which, together with said posts, form a pair of upright rear corner frame structures; a seat assembly including a seat supporting bracket; means securing said supporting bracket to said web; an operator's seat being mounted on said supporting bracket; a front pair of upright corner frame structures respectively arranged in general fore-and-aft alignment with said pair of upright rear corner frame structures; second securing means fixing the bottom ends of said front pair of upright corner frame structures to said tractor main frame; and first and second fenders respectively being integrally fixed to the front and rear upright frame structures at the opposite sides of the tractor.

9. The tractor defined in claim 8 wherein the first and second securing means includes a pair of fore-and-aft extending bottom frame members located at the opposite sides of the transmission housing and crossing said axle housings; a first bottom cross member extending between and joining the bottom frame members at respective locations at the lower ends of the front pair of upright frame members; a second bottom cross member extending between and joining the bottom frame members at locations intermediate the first cross member and the rear ends of the bottom frame members; and a floor overlying and being connected to the bottom frame and cross members.

10. The tractor defined in claim 9 wherein said roll-over protective frame further includes a front pair of upright corner frame structures respectively arranged in general fore-and-aft alignment with said pair of upright rear corner frame structures; second securing means fixing the bottom ends of said front pair of upright corner frame structures to said tractor main frame; first and second securing means including a pair of fore-and-aft extending bottom frame members located at the opposite sides of the transmission housing and crossing said axle housings; a first bottom cross member extending between and joining the bottom frame members at respective locations at the lower ends of the front pair of upright frame members; a second bottom cross member extending between and joining the bottom frame members at locations intermediate the first cross member and the rear ends of the bottom frame members; and a floor overlying and being connected to the bottom frame and cross members.

11. The invention defined in claim 9 wherein said floor terminates rearwardly at a vertical wall; and a seat assembly housing being integral with the upper edge of the vertical wall, the fenders and the web.

* * * * *

UNITED STATES PATENT OFFICE
CERTIFICATE OF CORRECTION

Patent No. 3,787,085       Dated 22 January 1974

Inventor(s) David Hoffer Bucher, Craig Eugene Christie, Don J. Rasmussen

It is certified that error appears in the above-identified patent and that said Letters Patent are hereby corrected as shown below:

Column 6, line 54, change "9" to -- 8 --.

Signed and sealed this 3rd day of September 1974.

(SEAL)
Attest:

McCOY M. GIBSON, JR.
Attesting Officer

C. MARSHALL DANN
Commissioner of Patents